UNITED STATES PATENT OFFICE.

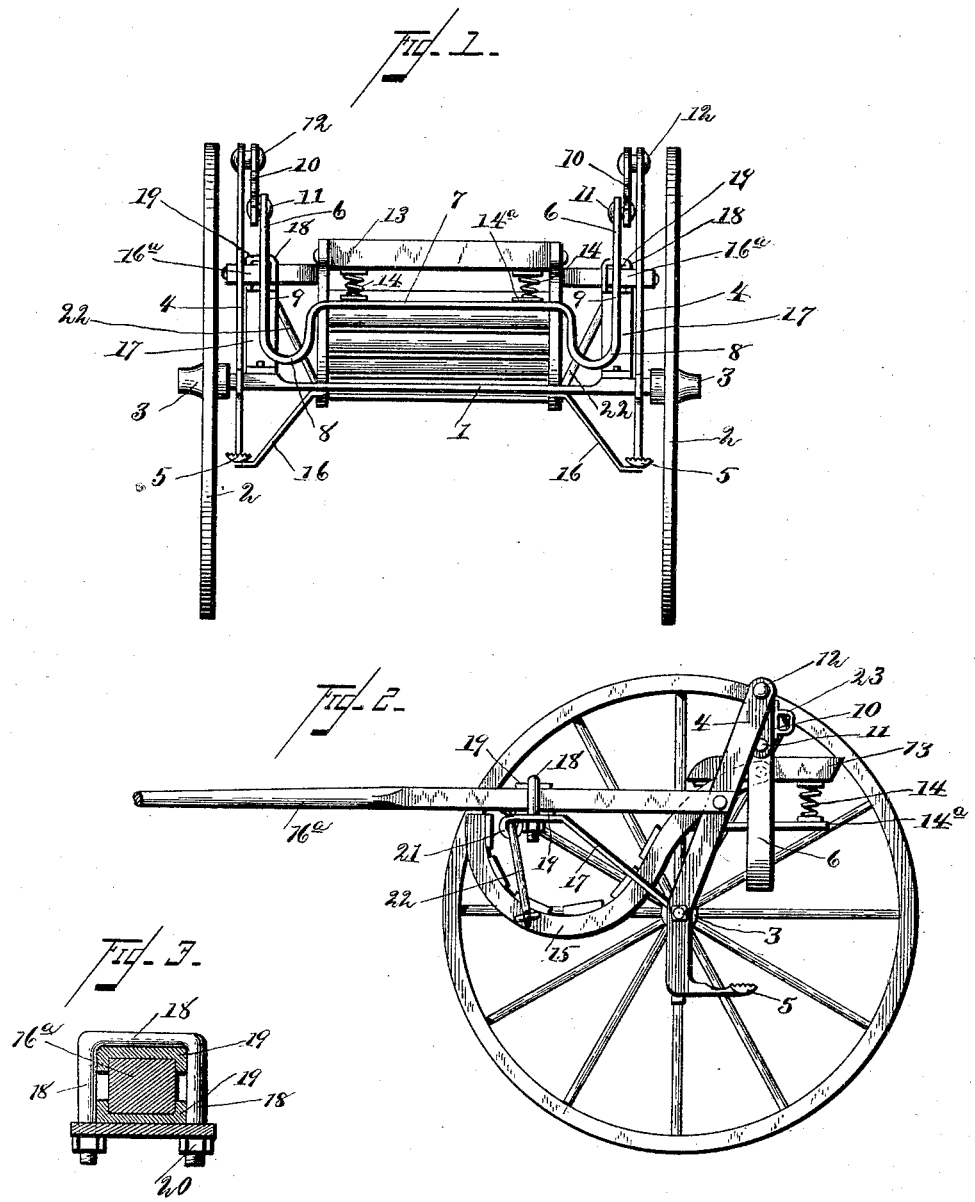

LYMAN HALL ZEIGLER, OF REDKEY, INDIANA.

ROAD-CART.

SPECIFICATION forming part of Letters Patent No. 433,386, dated July 29, 1890.

Application filed December 12, 1889. Serial No. 333,420. (No model.)

*To all whom it may concern:*

Be it known that I, LYMAN HALL ZEIGLER, a citizen of the United States, and a resident of Redkey, in the county of Jay and State of Indiana, have invented certain new and useful Improvements in Road-Carts; and I do hereby declare that the following is a full, clear, and exact description of the invention, which will enable others skilled in the art to which it appertains to make and use the same.

My invention relates to certain improvements in sulkies or two-wheeled road-wagons, the object being to provide such a vehicle in which the body is hung in a swinging frame, whereby the rider is rendered more comfortable by reason of the seat always being in a horizontal position. By this construction, also, the center of gravity is changed with variations in the height of either wheel, thereby greatly lessening the danger of overturning or upsetting.

The invention consists in the several novel features of construction and new combinations of parts, hereinafter fully described, and then set forth in the appended claims.

In the accompanying drawings, Figure 1 is a rear view of a sulky or two-wheeled vehicle constructed in accordance with my invention. Fig. 2 is a side elevation of the same with the near wheel removed, and Fig. 3 is an end view of one of the shafts and the clamp by which it is secured in place.

In the said drawings the reference-numeral 1 designates the axle, and 2 2 the wheels, of the vehicle, said axles being provided with the usual journals, upon which the hub 3 of the wheels revolve. Mounted securely upon the axle 1 is an upright 4, which has its lower end extended downwardly and then backwardly, forming the step 5, to aid in getting into the vehicle. To the upper ends of the uprights 4 is secured the swinging frame 6. This frame consists of a horizontal central portion 7, having the downwardly-depending portions 8 and the upwardly-extending portions 9, which are pivoted to the short arms 10 by means of pivots 11, the arms 10 in turn being pivoted to the uprights 4 by pivots 12.

The numeral 13 designates the seat, which is supported upon the coiled springs 14, secured to the cross-pieces 14ª, which are carried by the frame 6, to which they are securely attached. This seat is supported by the curved arms 15, which are secured thereto at each side near the middle or center of the length, and they extend downwardly and then upwardly in a compound curve, as seen more clearly in Fig. 2. These curved arms form the frame for the body of the vehicle, said body being composed of the usual slats secured to said arms.

The numeral 16 designates a brace secured to each upright 4, near the point where the step is formed, and extend upwardly to the axle, where they are attached, thus securely bracing the uprights and preventing any lateral movement thereof. The shafts are designated by the numeral 16ª, and are pivoted at their rear ends to the uprights.

17 17 designate two braces, one near each end of the axle, to which they are securely and rigidly attached. These braces extend upwardly and forwardly and are secured by means of bolts 18 18 to the clamps 19 on the shafts. These clamps consist of two plates having their ends turned inwardly, so as to embrace the shafts. These plates are held and secured in place by means of the strapbolts 18, which pass through apertures in the upper ends of the braces 17 and are carried around and over the top plate, their ends being screw-threaded to receive the nuts 20, by which they are firmly held in place. The object of this clamp is to enable the shafts to be slightly twisted up and down by shifting the clamp forward or backward, thus raising or lowering the shafts, so as to use a high or low horse, as may be desired. Upon the under side of the forward end of each clamp is formed an eye 21, with which engages the upper end of a swinging link 22, the other end of said link being connected with the arms forming the body-frame, and thus supporting the forward part of the body. 23 23 designate hand-holds on the uprights for the purpose of assisting a person in getting into the vehicle.

From the above it will be seen that the vehicle-body will have a swinging motion in every direction, and that consequently the seat will always be in a level or horizontal position, no matter what may be the position of the wheels with regard to each other. It will thus be almost impossible for the occupant to be thrown out, even if the horse should fall down, and in going up or down hill he will be equally free from danger, owing to the tendency of the seat to assume a level position. It will also be observed that the center of gravity will change its variations in the height of either wheel, so that if one of the wheels should get into a rut there would be less liability of upsetting or overturning than with a vehicle of the ordinary construction.

Having thus described my invention, what I claim is—

1. The combination, with the axle of a vehicle, of an upright secured to the axle near each end, a swinging frame pivoted to the upper ends of the uprights, a vehicle-body having its rear portion supported by springs mounted upon said swinging frame, the shafts connected at their ends with the uprights, and links connecting the front portion of the body with the shafts, substantially as described.

2. The combination, with the axle, of the uprights secured thereto at each end and having their lower portions downwardly and outwardly extended to form a step, the swinging frame pivoted to the upper ends of the uprights, the vehicle-body supported by springs mounted upon said frame, the shafts secured to said uprights, and the links connecting the shafts and body, substantially as described.

3. The combination, with the axle, of the uprights secured near each end thereof, the swinging frame pivoted in said uprights, the body supported upon said frame, the coiled springs interposed between said frame and the seat, and the curved arms connecting with the seat and to the shafts, substantially as described.

4. The combination of the axle, the uprights secured thereto, the swinging frame pivoted to the uprights, the curved arms forming the body-frame secured to and supporting the seat, the springs interposed between the seat and pivoted frame, the shafts, the brace connecting the shafts and axle, and the screw-clamps secured to the forward part of said brace and to the shafts, substantially as described.

In testimony that I claim the foregoing as my own I have hereunto affixed my signature in presence of two witnesses.

LYMAN HALL ZEIGLER.

Witnesses:
CHARLES D. GARNET,
THOS. B. LYON.